United States Patent
Kuehbauch

(12) 
(10) Patent No.: US 6,817,056 B2
(45) Date of Patent: Nov. 16, 2004

(54) WINDSCREEN WIPER DRIVE

(75) Inventor: Gerd Kuehbauch, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 10/030,334

(22) PCT Filed: Mar. 9, 2001

(86) PCT No.: PCT/DE01/00890

§ 371 (c)(1),
(2), (4) Date: Apr. 29, 2002

(87) PCT Pub. No.: WO01/68423

PCT Pub. Date: Sep. 20, 2001

(65) Prior Publication Data

US 2002/0178526 A1 Dec. 5, 2002

(30) Foreign Application Priority Data

Mar. 17, 2000 (DE) .......................................... 100 13 201

(51) Int. Cl.⁷ ............................... B60S 1/24; B60S 1/34
(52) U.S. Cl. .............................. 015/250.21; 15/250.31; 15/250.351
(58) Field of Search ........................ 15/250.21, 250.31, 15/250.23, 250.351

(56) References Cited

U.S. PATENT DOCUMENTS 5,860,186 A * 1/1999 Schael et al. ............ 15/250.21
6,568,022 B1 * 5/2003 Zimmer .................. 15/250.21

FOREIGN PATENT DOCUMENTS

DE  198 16 210 A  10/1999
EP  0 182 123 A   5/1986

* cited by examiner

*Primary Examiner*—Gary K. Graham
(74) *Attorney, Agent, or Firm*—Michael J. Striker

(57) ABSTRACT

In a windshield wiper drive mechanism, having a pivotably supported drive shaft, a drive rocker (10) solidly connected to it, a coupling rocker (14) that is connected to the drive rocker by a drive joint (16), a support rocker (18) that is connected to the coupling rocker (14) by a support joint (20) and is supported by a blind joint (22), a windshield wiper arm (26), which is connected to the coupling rocker by a joint (28), a contact-pressure spring (30) that acts upon the windshield wiper arm relative to the coupling rocker, and a compensation joint (24) that is disposed on one of the rockers, the object is for the tilting moments generated by the contact-pressure spring to be reduced. To that end, a compensation spring (34) is provided on the compensation joint.

5 Claims, 5 Drawing Sheets

WINDSCREEN WIPER DRIVE

BACKGROUND OF THE INVENTION

The invention relates to a windshield wiper drive mechanism, having a pivotably supported drive shaft, a drive rocker solidly connected to it, a coupling rocker that is connected to the drive rocker by a drive joint, a support rocker that is connected to the coupling rocker by a support joint and is supported by a blind joint, a windshield wiper arm, which is connected to the coupling rocker by a joint, a contact-pressure spring that acts upon the windshield wiper arm relative to the coupling rocker, and a compensation joint that is disposed on one of the rockers.

One such windshield wiper drive mechanism is known from European Patent Disclosure EP-A 0 182 123. It serves to move a windshield wiper blade, secured to the windshield wiper arm, with a reciprocating motion over a windshield to be cleaned. To prevent twisting from occurring in the mechanism, based on a four-bar mechanism, that comprises the drive rocker, coupling rocker and support rocker, the compensation joint is provided, which is disposed on the coupling rocker and divides it into two portions movable relative to one another. This disadvantage in this construction is that the contact-pressure spring exerts a tilting moment on the coupling rocker, and this leads to increased stresses on the various bearings.

The object of the invention is thus to refine a windshield wiper drive mechanism of the type defined at the outset such that the tilting moment generated by the contact-pressure spring does not impair the operation of the windshield wiper drive mechanism.

SUMMARY OF THE INVENTION

The windshield wiper drive mechanism has the advantage that a compensation spring compensates entirely or at least in part for the tilting moment generated by the contact-pressure spring, so that the bearings of the coupling rocker experience less stress. Thus they can be made smaller, and non-jerking travel of the entire windshield wiper drive mechanism is obtained.

BRIEF DESCRIPTION OF THE DRAWINGS

The invention is described below with reference to various embodiments that are shown in the accompanying drawings. Shown in the drawings are.

DESCRIPTION OF THE PREFERRED EMBODIMENTS

Figure 1:
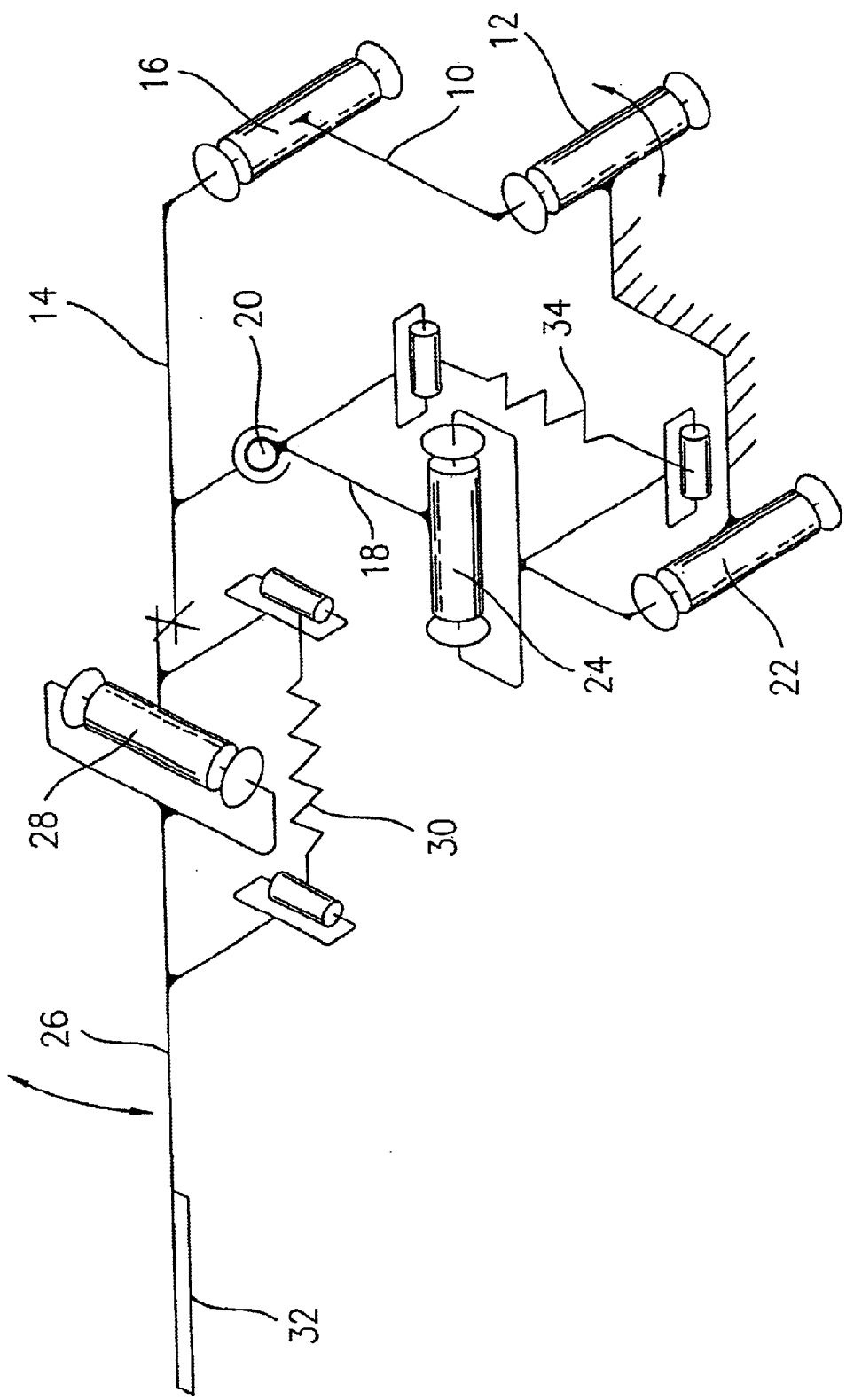
FIG. 1, in a schematic elevation view, a windshield wiper drive mechanism in a first embodiment of the invention.

FIG. 1 schematically shows a windshield wiper drive mechanism in a first embodiment. It includes a drive rocker 10, which is supported, solidly secure to the vehicle, in a pivot joint 12 for the drive rockers. The drive rocker 10 can be set to reciprocation by a windshield wiper motor (not shown).

A coupling rocker 14 is connected to the drive rocker 10 by means of a drive joint 16. The drive joint 16 is embodied here as a pivot joint. Connected to the coupling rocker 14 is a support rocker 18 by means of a support joint 20, which is embodied here as a ball joint. The support rocker 18 is supported in a manner solidly connected to the vehicle by a blind joint 22, embodied here as a pivot joint. Between the support joint 20 and the blind joint 22, the support rocker 18 is provided with a compensation joint 24, whose pivot axis is defined approximately perpendicular to the pivot axis defined by the blind joint 22. The compensation joint 24 makes it possible to pivot the support joint 20 in a plane that is defined by the pivot axis of the blind joint 22 and by the support joint 20.

Connected to the coupling rocker 14, in a manner known per se, is a windshield wiper arm 26, and a windshield wiper arm pivot joint 28 and a contact-pressure spring 30 are provided, so that a windshield wiper blade 32 mounted on the windshield wiper arm 26 is urged toward a window to be cleaned.

A compensation spring 34 which is embodied as a tension spring acts between the two portions of the support rocker, which are located on one side and the other of the compensation joint 24. The compensation spring is disposed and dimensioned such that it compensates for the tilting moment that is exerted on the drive joint 16 as a result of the compensation spring and the windshield wiper blade 32 braced against the window; the compensation spring thus generates a force acting upon the support joint toward the window.

Figure 2:
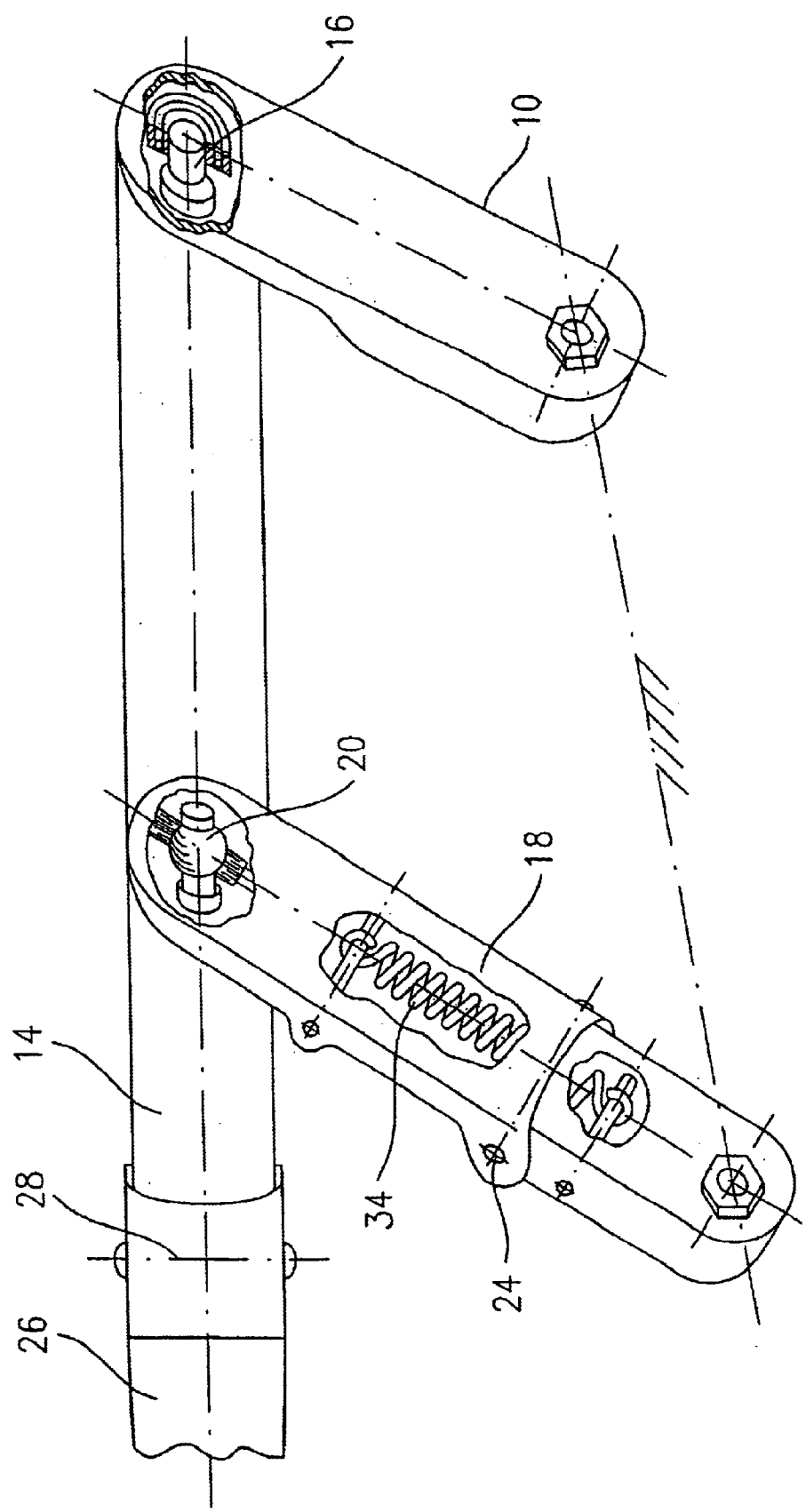
FIG. 2, in a perspective elevation view, the drive rocker, support rocker and coupling rocker of the windshield wiper drive mechanism of FIG. 1.

As can be seen in FIG. 2, the compensation spring is integrated with the support rocker. The force exerted by it on the support joint can be adjusted by means of the spacing of the line of action of the compensation spring from the axis of the compensation joint 24 and by means of the spring force.

Figure 3:
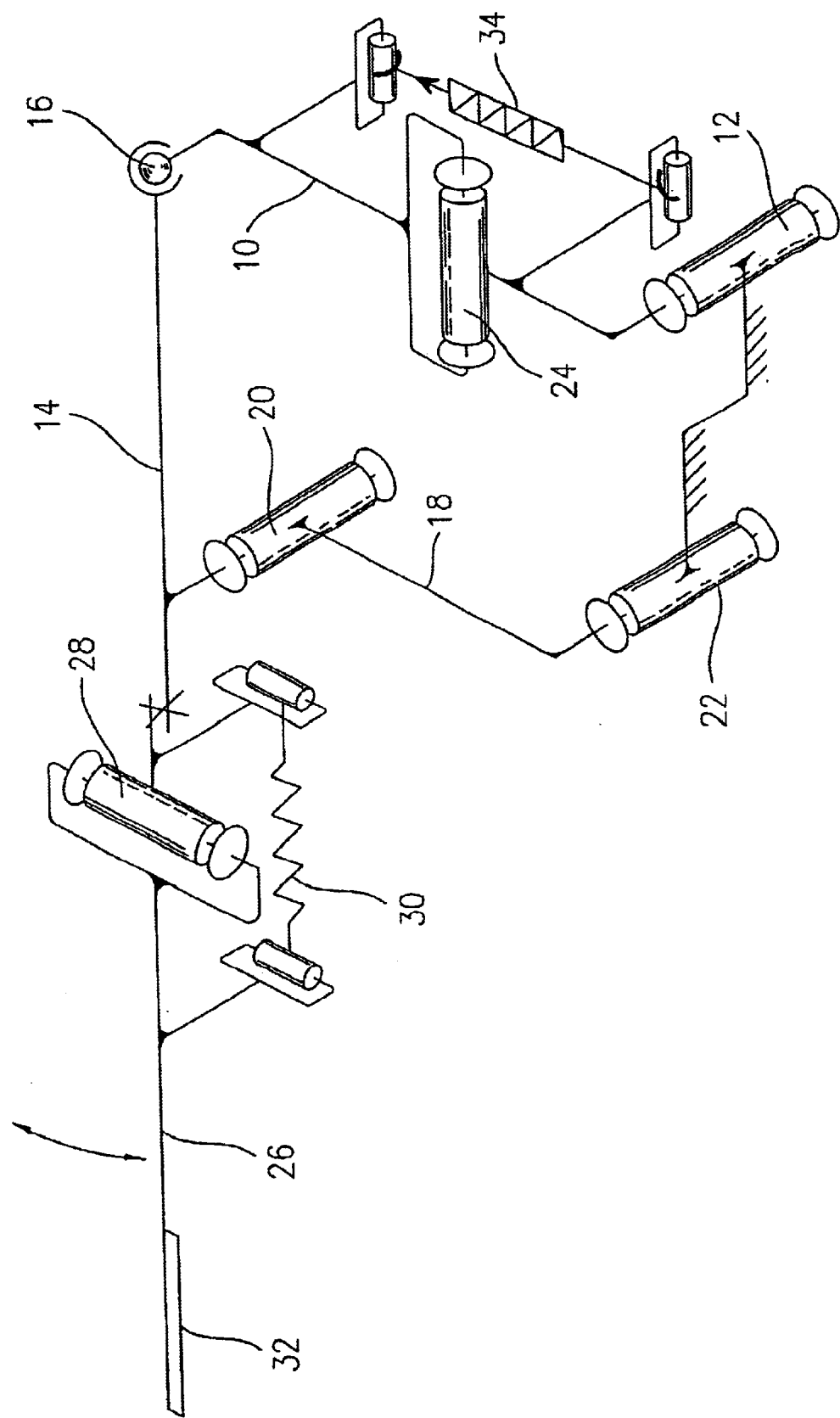
FIG. 3, in a schematic elevation view, a windshield wiper drive mechanism in a second embodiment of the invention.
Figure 4:
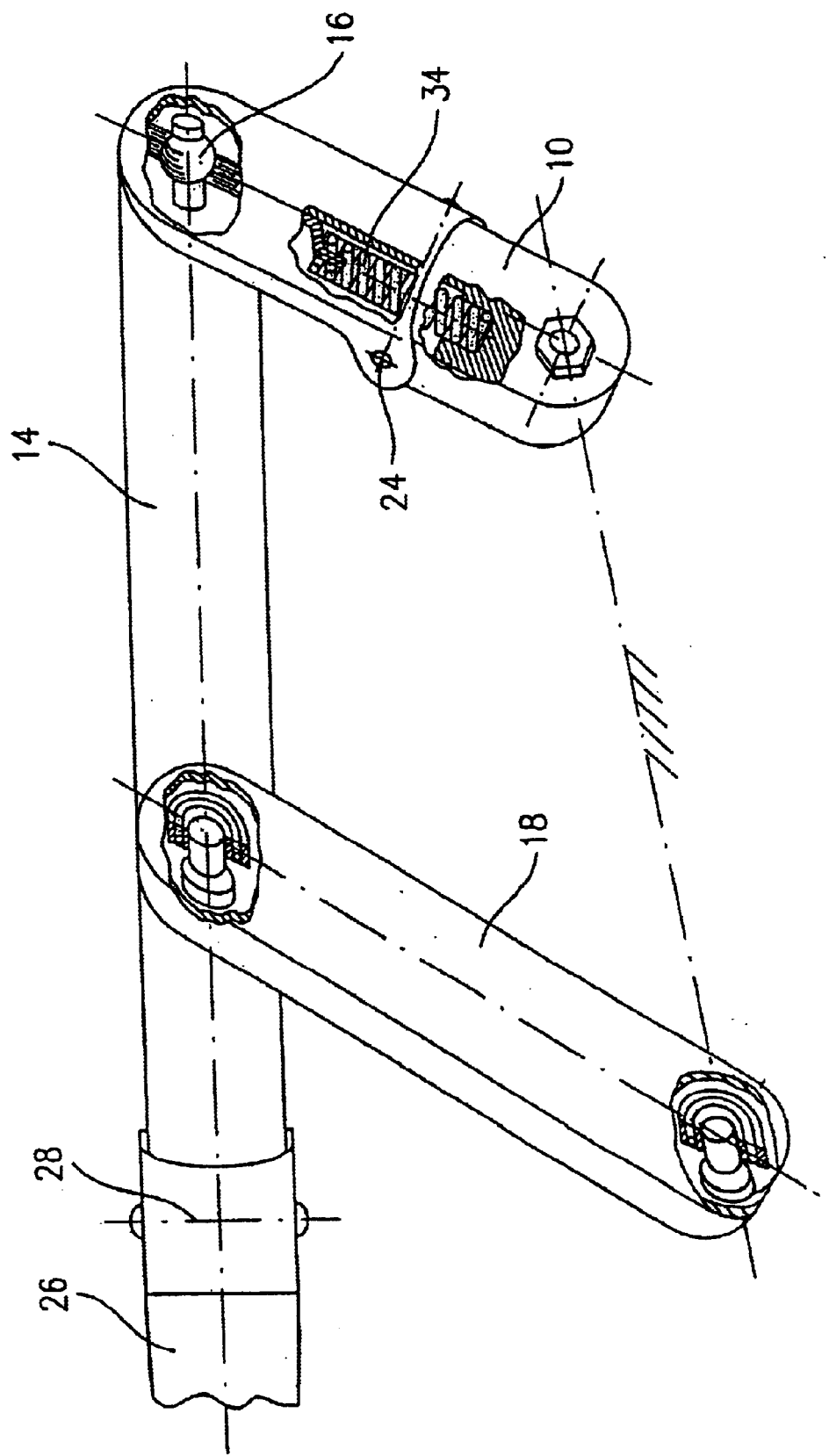
FIG. 4, in a perspective elevation view, the drive rocker, support rocker and coupling rocker of the windshield wiper drive mechanism of FIG. 3.

In FIGS. 3 and 4, a windshield wiper drive mechanism in a second embodiment is shown. For the components known from the first embodiment, the same reference numerals are used, and the reader is referred to the explanations above.

In the second embodiment as well, a five-bar mechanism is involved. Compared to the first embodiment, however, the disposition of the joints for the drive rocker and the support rocker are transposed; that is, the support joint 20 is embodied as a pivot joint, while the drive joint 16 is now a ball joint. Also the drive rocker is now provided with the compensation joint 24 and the compensation spring 34.

Figure 5:
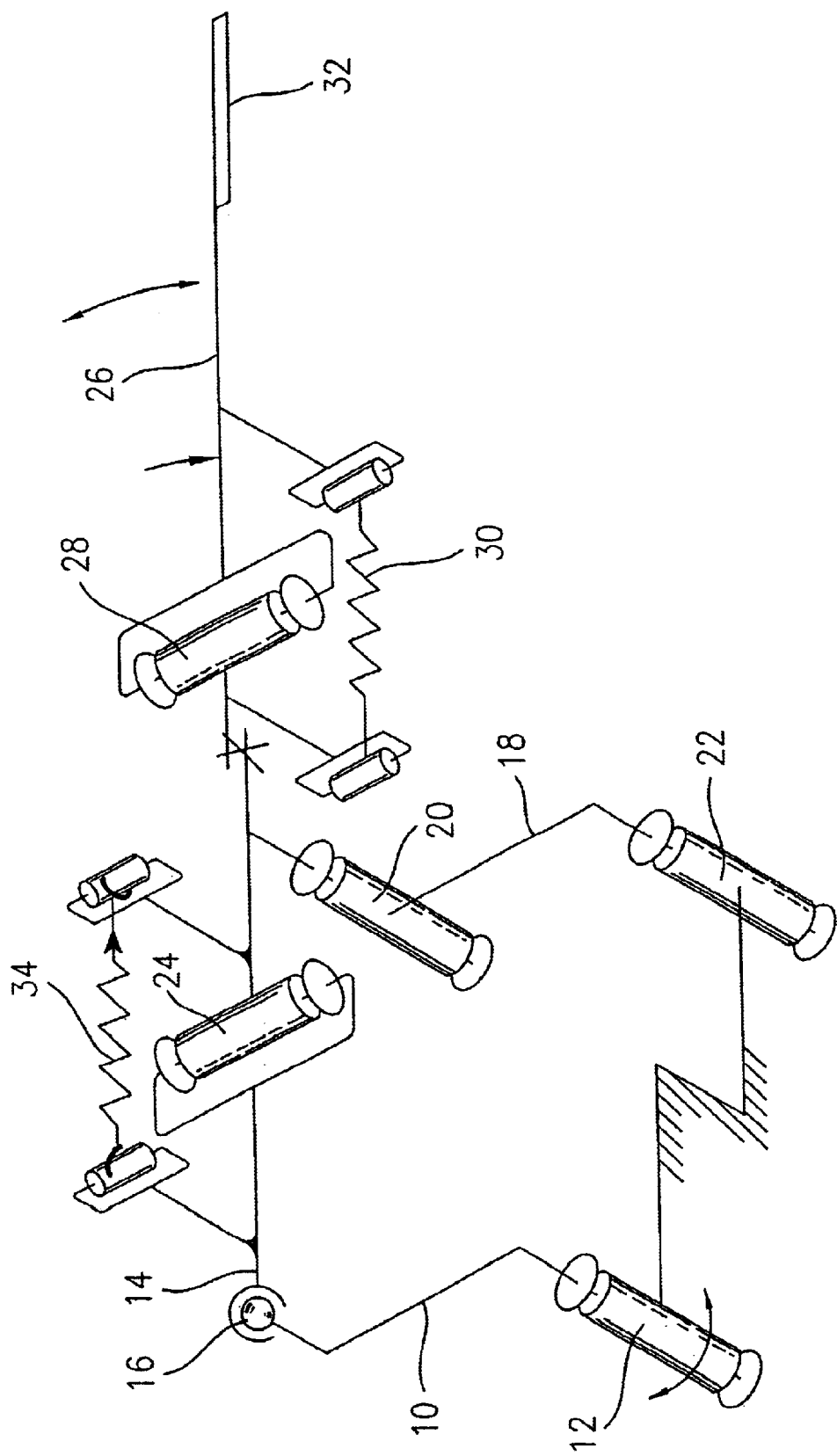
FIG. 5, in a schematic elevation view, a windshield wiper drive mechanism in a third embodiment of the invention.

In FIG. 5, a windshield wiper drive mechanism in a third embodiment is shown. Once again, for the components known from the above embodiments, the same reference numerals are used, and reference is made to the above explanations.

Unlike the first two embodiments, in the third embodiment the coupling rocker is provided with the compensation joint 24 and the compensation spring 34, so that the support joint is relieved directly of the tilting moment that is generated by the contact-pressure spring.

| List of Reference Numerals | |
|---|---|
| 10: | Drive rocker |
| 12: | Pivot joint for drive rockers |
| 14: | Coupling rocker |
| 16: | Drive joint |
| 18: | Support rocker |
| 20: | Support joint |
| 22: | Blind joint |
| 24: | Compensation joint |
| 26: | Windshield wiper arm |
| 28: | Windshield wiper arm pivot joint |
| 30: | Contact-pressure spring |
| 32: | Windshield wiper blade |
| 34: | Compensation spring |

What is claimed is:

1. A windshield wiper drive mechanism, having a pivotably supported drive shaft, a drive rocker (10) solidly connected to it, a coupling rocker (14) that is connected to the drive rocker by a drive joint (16), a support rocker (18) that is connected to the coupling rocker (14) by a support joint (20) and is supported by a blind joint (22), a windshield wiper arm (26), which is connected to the coupling rocker by a joint (28), a contact-pressure spring (30) that acts upon the windshield wiper arm relative to the coupling rocker, and a compensation joint (24) that is disposed on one of the rockers, characterized in that a compensation spring (34) is provided on the compensation joint.

2. The windshield wiper drive mechanism of claim 1, characterized in that the drive joint (16) is a ball joint; that the blind joint (22) and the support joint (20) are each a pivot joint; and that the compensation joint (24) and the compensation spring (34) are mounted on the coupling rocker (14).

3. The windshield wiper drive mechanism of claim 1, characterized in that the drive joint (16) is a ball joint; that the blind joint (22) and the support joint (20) are a pivot joint; and that the compensation joint (24) and the compensation spring (34) are mounted on the drive rocker (10).

4. The windshield wiper drive mechanism of claim 1, characterized in that the drive joint (16) and the blind joint (22) are a pivot joint; that the support joint (20) is a ball joint; and that the compensation joint (24) and the compensation spring (34) are mounted on the support rocker (18).

5. The windshield wiper drive mechanism of claim 1, characterized in that the compensation spring (34) is a tension spring.

* * * * *